(12) United States Patent
Dionisio (10) Patent No.: US 12,329,319 B2
(45) Date of Patent: Jun. 17, 2025

(54) COFFEE GRINDING MACHINE CONFIGURED TO PROVIDE DIFFERENT PARTICLE SIZE PROFILES AND ASSOCIATED METHOD

(71) Applicant: LA MARZOCCO S.R.L., Scarperia (IT)

(72) Inventor: Andrea Dionisio, Scarperia (IT)

(73) Assignee: LA MARZOCCO S.R.L., Scarperia (IT)

( * ) Notice: Subject to any disclaimer, the term of this patent is extended or adjusted under 35 U.S.C. 154(b) by 922 days.

(21) Appl. No.: 17/428,181

(22) PCT Filed: Feb. 5, 2020

(86) PCT No.: PCT/IB2020/050907
§ 371 (c)(1),
(2) Date: Aug. 3, 2021

(87) PCT Pub. No.: WO2020/161630
PCT Pub. Date: Aug. 13, 2020

(65) Prior Publication Data
US 2022/0117442 A1   Apr. 21, 2022

(30) Foreign Application Priority Data
Feb. 5, 2019   (IT) .................. 102019000001629

(51) Int. Cl.
*A47J 42/44* (2006.01)
*A47J 31/40* (2006.01)
(Continued)

(52) U.S. Cl.
CPC ............. *A47J 42/44* (2013.01); *A47J 31/404* (2013.01); *A47J 31/42* (2013.01); *A47J 42/40* (2013.01); *A47J 42/46* (2013.01)

(58) Field of Classification Search
CPC .......... A47J 42/46; A47J 31/40; A47J 31/404; A47J 42/44
(Continued)

(56) References Cited

U.S. PATENT DOCUMENTS 4,967,648 A   11/1990   Helbling
5,133,983 A    7/1992   Greiwe
(Continued)

FOREIGN PATENT DOCUMENTS

AU   2015100960       9/2015
CA   2962617 A1       4/2016
(Continued)

OTHER PUBLICATIONS

KR20170051281 translate text (Year: 2025).*
(Continued)

*Primary Examiner* — Eric S Stapleton
*Assistant Examiner* — Yeong Juen Thong
(74) *Attorney, Agent, or Firm* — NIXON & VANDERHYE P.C.

(57) ABSTRACT

A coffee grinding machine (10) and an espresso coffee machine are described. The coffee grinding machine comprises a first grinder and second grinder cooperating with each other so as to grind coffee beans, obtaining a first dose of ground coffee during a first grinding cycle. The coffee grinding machine comprises a motor which rotates one of the grinders relative to the other one at a rotation speed. The coffee grinder machine is configured to modify the rotation speed so as to perform a second grinding cycle in which a second dose of ground coffee is obtained. The rotation speed is modified depending on quantitative information received from the espresso coffee machine and based on a coffee preparation cycle performed with said first dose of ground coffee, wherein the quantitative information may be a flow
(Continued)

value measured in the espresso coffee machine or a brew ratio value.

17 Claims, 7 Drawing Sheets

(51) Int. Cl.
- *A47J 31/42* (2006.01)
- *A47J 42/40* (2006.01)
- *A47J 42/46* (2006.01)

(58) Field of Classification Search
USPC .......................................... 99/280, 283, 300
See application file for complete search history.

(56) References Cited

U.S. PATENT DOCUMENTS

| | | | |
|---|---|---|---|
| 5,239,519 | A | 8/1993 | Nelson |
| 5,259,297 | A | 11/1993 | Guiliano |
| 5,372,061 | A | 12/1994 | Albert |
| 5,462,236 | A | 10/1995 | Knepler |
| 5,555,791 | A | 9/1996 | McNeill et al. |
| 5,870,943 | A | 2/1999 | Levi |
| 6,058,986 | A | 5/2000 | Bethuy |
| 6,067,894 | A | 5/2000 | Eugster |
| 6,085,637 | A | 7/2000 | Fukushima |
| 6,155,158 | A | 12/2000 | Anson |
| 6,164,189 | A | 12/2000 | Anson |
| 6,459,854 | B1 | 10/2002 | Yoakim et al. |
| 6,550,370 | B2 | 4/2003 | Dam |
| 6,611,660 | B1 | 8/2003 | Sagal |
| 7,461,585 | B2 | 12/2008 | Nenov |
| 8,215,229 | B2 | 7/2012 | Faccinti |
| 8,272,319 | B2 | 9/2012 | Jarisch |
| 8,663,724 | B1 | 3/2014 | Banasik |
| 8,696,899 | B2 | 4/2014 | Roulin |
| 8,850,956 | B2 | 10/2014 | Bianchi et al. |
| 8,850,959 | B2 | 10/2014 | Banchi et al. |
| 8,857,318 | B2 | 10/2014 | Zhong |
| 8,895,095 | B2 | 11/2014 | Star et al. |
| 9,125,519 | B2 | 9/2015 | Goeltenboth et al. |
| 9,578,986 | B2 | 2/2017 | Ceotto et al. |
| 9,986,870 | B2 | 6/2018 | Reyhanloo |
| 10,602,874 | B2 | 3/2020 | Cable |
| 10,687,660 | B2 | 6/2020 | Gatti et al. |
| 10,881,242 | B2 | 1/2021 | Dionisio et al. |
| 11,103,104 | B2 | 8/2021 | Bakke et al. |
| 11,122,927 | B2 | 9/2021 | Bianchi et al. |
| 2004/0079237 | A1 | 4/2004 | Denisart |
| 2004/0244599 | A1 | 12/2004 | Wei |
| 2005/0011364 | A1 | 1/2005 | Chen et al. |
| 2006/0037481 | A1 | 2/2006 | Bicht |
| 2006/0150821 | A1 | 7/2006 | Paul |
| 2006/0278093 | A1 | 12/2006 | Biderman et al. |
| 2006/0283329 | A1 | 12/2006 | Ronci |
| 2007/0051247 | A1 | 3/2007 | Felty |
| 2007/0193452 | A1 | 8/2007 | Campetella et al. |
| 2007/0227363 | A1 | 10/2007 | Verna |
| 2007/0277676 | A1 | 12/2007 | Crivellin |
| 2008/0190297 | A1 | 8/2008 | Gussmann |
| 2009/0095165 | A1 | 4/2009 | Nosler |
| 2009/0114099 | A1 | 5/2009 | Gotlenboth |
| 2009/0205502 | A1 | 8/2009 | Carbonini |
| 2010/0005971 | A1 | 1/2010 | Faccinti |
| 2010/0018407 | A1 | 1/2010 | Liu |
| 2010/0095852 | A1 | 4/2010 | Remo et al. |
| 2010/0112165 | A1 | 5/2010 | Masciandaro et al. |
| 2010/0229728 | A1 | 9/2010 | Kiefer et al. |
| 2010/0233337 | A1 | 9/2010 | Aigner |
| 2010/0263543 | A1 | 10/2010 | Krauchi |
| 2010/0282090 | A1 | 11/2010 | Etter |
| 2010/0300299 | A1 | 12/2010 | Epars et al. |
| 2011/0005398 | A1 | 1/2011 | Garcia |
| 2011/0042408 | A1 | 2/2011 | Giordano |
| 2011/0048243 | A1 | 3/2011 | Bambi |
| 2011/0117259 | A1 | 5/2011 | Storek |
| 2012/0017767 | A1 | 1/2012 | Samso Besora |
| 2012/0090474 | A1 | 4/2012 | Carbonini |
| 2012/0118164 | A1 | 5/2012 | Tonelli et al. |
| 2012/0121780 | A1 | 5/2012 | Lai et al. |
| 2012/0171332 | A1 | 7/2012 | Lai |
| 2012/0222666 | A1 | 9/2012 | Morgandi |
| 2013/0098249 | A1 | 4/2013 | Fidler et al. |
| 2013/0330453 | A1 | 12/2013 | Doglioni Majer |
| 2014/0123857 | A1 | 5/2014 | Rego |
| 2014/0137746 | A1 | 5/2014 | Moran et al. |
| 2014/0314921 | A1 | 10/2014 | Kuempel et al. |
| 2014/0352543 | A1 | 12/2014 | Boni |
| 2016/0199851 | A1 | 7/2016 | Vettorel |
| 2016/0220067 | A1 | 8/2016 | Teahan |
| 2016/0249763 | A1 | 9/2016 | Llopis |
| 2017/0119195 | A1 | 5/2017 | Al-Sahibani |
| 2018/0055275 | A1* | 3/2018 | Bianchi ............... A47J 31/42 |
| 2018/0153332 | A1 | 6/2018 | Abbiati |
| 2018/0271319 | A1 | 9/2018 | Gatti et al. |
| 2018/0279831 | A1 | 10/2018 | Ottavi |
| 2018/0303284 | A1 | 10/2018 | Gatti et al. |
| 2018/0360257 | A1 | 12/2018 | Dionisio et al. |
| 2019/0008325 | A1 | 1/2019 | Huerta-Ochoa |
| 2019/0075964 | A1 | 3/2019 | Della Pietra et al. |
| 2019/0274470 | A1* | 9/2019 | Curtis ............... A47J 31/46 |
| 2020/0093323 | A1 | 3/2020 | Dionisio et al. |
| 2020/0237137 | A1 | 7/2020 | Bakke et al. |
| 2021/0204748 | A1 | 7/2021 | Della Pietra et al. |
| 2022/0047120 | A1 | 2/2022 | Dionisio |
| 2022/0095839 | A1 | 3/2022 | Dionisio et al. |

FOREIGN PATENT DOCUMENTS

| | | |
|---|---|---|
| CH | 677 438 A5 | 5/1991 |
| CN | 1424886 A | 6/2003 |
| CN | 101229019 A | 7/2008 |
| CN | 101600377 A | 12/2009 |
| CN | 100588354 C | 2/2010 |
| CN | 201401779 Y | 2/2010 |
| CN | 101778586 A | 7/2010 |
| CN | 202179442 U | 4/2012 |
| CN | 102595984 A | 7/2012 |
| CN | 102761565 | 10/2012 |
| CN | 103118574 A | 5/2013 |
| CN | 203 122 128 | 8/2013 |
| CN | 103391734 A | 11/2013 |
| CN | 104080379 A | 10/2014 |
| CN | 104619218 A | 5/2015 |
| CN | 105433804 A | 3/2016 |
| CN | 105640339 A | 6/2016 |
| CN | 106073509 A | 11/2016 |
| CN | 107692874 | 2/2018 |
| CN | 108135399 A | 6/2018 |
| DE | 29 19 110 | 11/1980 |
| DE | 3503011 | 7/1986 |
| DE | 10 2011 116 913 A1 | 9/2012 |
| DE | 10 2013 107077 | 1/2015 |
| DE | 102015003806 B3 | 6/2016 |
| EP | 0 838 185 | 4/1998 |
| EP | 1 034 729 | 9/2000 |
| EP | 1 688 072 B1 | 8/2006 |
| EP | 1 747 736 | 1/2007 |
| EP | 1 886 604 A1 | 2/2008 |
| EP | 2 218 374 A2 | 8/2010 |
| EP | 2 314 182 | 4/2011 |
| EP | 2 316 796 | 5/2011 |
| EP | 2 490 580 | 8/2012 |
| EP | 2 490 578 | 9/2013 |
| EP | 2 644 066 | 10/2013 |
| EP | 2 701 563 | 3/2014 |
| EP | 2 789 276 | 10/2014 |
| EP | 2810592 | 12/2014 |
| EP | 3 042 591 | 7/2016 |
| EP | 3 064 099 | 9/2016 |
| EP | 3087844 | 11/2016 |
| EP | 3 167 782 | 5/2017 |
| EP | 3 225 141 | 10/2017 |

(56) References Cited

FOREIGN PATENT DOCUMENTS

| | | |
|---|---|---|
| EP | 3 329 815 | 6/2018 |
| FR | 1 174 038 | 3/1959 |
| FR | 1 449 310 | 8/1966 |
| FR | 2 901 681 | 12/2007 |
| GB | 726 272 | 3/1955 |
| GB | 728 476 | 4/1955 |
| JP | 2004-534562 A | 11/2004 |
| JP | 2005-040605 A | 2/2005 |
| JP | 2009-537260 A | 10/2009 |
| JP | 2012-035040 A | 2/2012 |
| JP | 2014-506820 A | 3/2014 |
| JP | 2015-518381 A | 7/2015 |
| JP | 2015-144714 A | 8/2015 |
| KR | 20170051281 A * | 5/2017 |
| RU | 2 160 035 C2 | 12/2000 |
| RU | 2 542 549 C2 | 1/2014 |
| TW | M514813 U | 1/2016 |
| WO | WO 2006/082064 | 8/2006 |
| WO | 1 898 758 B1 | 11/2006 |
| WO | WO 2008/114210 | 9/2008 |
| WO | 2009/010190 | 1/2009 |
| WO | WO2009010190 A1 | 1/2009 |
| WO | WO 2009/068921 | 6/2009 |
| WO | WO 2010/113116 | 10/2010 |
| WO | WO 2011/055189 | 5/2011 |
| WO | WO 2011/095926 | 8/2011 |
| WO | WO 2011/140582 | 11/2011 |
| WO | WO 2012/138327 A1 | 10/2012 |
| WO | WO 2012/146641 A1 | 11/2012 |
| WO | 2013/112732 | 8/2013 |
| WO | 2013/121438 | 8/2013 |
| WO | WO 2014/177925 | 11/2014 |
| WO | WO 2014/187110 A1 | 11/2014 |
| WO | 2014/207281 | 12/2014 |
| WO | WO 2015/006244 A1 | 1/2015 |
| WO | WO 2015/055342 A1 | 4/2015 |
| WO | WO 2015/055557 | 4/2015 |
| WO | WO 2016/057568 | 4/2016 |
| WO | WO 2016/093920 | 6/2016 |
| WO | WO 2016/124573 | 8/2016 |
| WO | WO 2017/009186 | 1/2017 |
| WO | WO 2017/009189 | 1/2017 |
| WO | WO 2017/055433 | 4/2017 |
| WO | WO 2017/068021 | 4/2017 |
| WO | WO2017055433 A1 | 4/2017 |
| WO | WO 2018/115876 | 6/2018 |
| WO | 2018/219878 | 12/2018 |
| WO | WO2018219878 A1 | 12/2018 |

OTHER PUBLICATIONS

U.S. Office Action dated Apr. 24, 2024 issued in U.S. Appl. No. 17/421,548, 25 pp.
U.S. Office Action dated Aug. 28, 2024 issued in U.S. Appl. No. 17/421,548, 20 pp.
International Search Report for PCT/EP2020/050773 dated Apr. 20, 2020, 4 pages.
Written Opinion of the ISA for PCT/EP2020/050773 dated Apr. 20, 2020, 5 pages.
Chinese Office Action dated Jul. 26, 2023, Chinese application 202080018293.X with English language translation.
International Search Report for PCT/IB2020/050907 dated Apr. 6, 2020, 4 pages.
Written Opinion of the ISA for PCT/IB2020/050907 dated Apr. 6, 2020, 6 pages.
U.S. Office Action dated May 25, 2023 issued in U.S. Appl. No. 17/428,128, 21 pp.
Principles of Operation—AC VFD Drives, retrieved date May 15, 2023; https://natural-resources.canada.ca/energy-efficiency/energy-star-canada/about/energy-star-announcements/publications/variable-frequency-drives/principles-operation-ac-vfd-drives/15433, 8 pp.
U.S. Appl. No. 17/289,093, filed Apr. 27, 2021, entitled "Espresso Coffee Machine With Adjustment of the Dispensing Pressure and Method for Adjusting the Dispensing Pressure of an Espresso Coffee Machine".
U.S. Appl. No. 17/286,133, filed Apr. 16, 2021, entitled "Active System for Monitoring and Filtering the Water for an Espresso Coffee Machine and Associated Espresso Coffee Machine".
U.S. Appl. No. 17/422,904, filed Jul. 14, 2021, entitled "Ultrasonic Cleaner Device for an Espresso Coffee Machine and Espresso Coffee Machine Incorporating Such a Cleaner Device".
U.S. Appl. No. 17/428,128, filed Aug. 3, 2021, entitled "Coffee Grinding Machine With Improved Dosing System and Associated Method".
U.S. Appl. No. 17/421,548, filed Jul. 8, 2021, entitled "Coffee Grinding Machine Configured To Provide a Dose of Stratified Ground Coffee and Associated Method".
International Search Report for PCT/EP2016/066181, mailed Oct. 5, 2016, 3 pages.
International Search Report for PCT/EP2016/074726, mailed Jan. 31, 2017, 2 pages.
International Search Report for PCT/EP2016/075182 mailed Feb. 23, 2017, 4 pages.
Written Opinion of the ISA for PCT/EP2016/075182 mailed Feb. 23, 2017, 5 pages.
English Translation for CN 102761565 published Oct. 2012.
English translation of JP Office Action mailed Jun. 8, 2021 in JP application 2018-517145.
International Search Report for PCT/EP2016/066186, mailed Aug. 12, 2016, 3 pages.
Office Action mailed Dec. 10, 2019 in U.S. Appl. No. 15/739,856.
International Search Report for PCT/EP2017/052213, mailed May 4, 2017, 3 pages.
International Search Report and Written Opinion mailed Jun. 9, 2016, issued in PCT/EP2016/053894.
International Search Report for PCT/IB2018/051865, mailed Jul. 2, 2018, 3 pages.
Written Opinion of the ISA for PCT/IB2018/051865, mailed Jul. 2, 2018, 5 pages.
Chinese Office Action and English translation mailed Mar. 31, 2021 in Chinese Application 201880018668.5.
Yingile et al, "Optimal Tuning of Temperature Control Parameters for Post-Mixed Beverage Machines Based on Changes in Thermal Load", Computer Technology and Automation, vol. 30, Issue 1, Mar. 15, 2011, pp. 33-38.
International Search Report for PCT/EP2019/079672 mailed Dec. 18, 2019, 3 pages.
Written Opinion of the ISA for PCT/EP2019/079672 mailed Dec. 18, 2019, 5 pages.
Blake, B., and S. Callendar, "Barista Tips and Techniques: Brew Ratios Around the World," Oct. 24, 2014, Newsletter, La Marzocco, Seattle, Wash., <https://home.lamarzoccousa.com/brew-ratios-around-world/> [retrieved Jun. 3, 2015], 10 pages.
International Search Report and Written Opinion mailed Jun. 15, 2015, issued in corresponding International Application PCT/IB2015/051903, filed Mar. 16, 2015, 10 pages.
Paul, "Weighing Espresso—How It Works," Nov. 16, 2010, Blog, Marco Beverage Systems U.S., Seattle, Wash., <http://marcobeveragesystems.com/us/weighing-espresso-how-it-works/> [retrieved Jun. 3, 2015], 1 page.
International Search Report for PCT/IB2019/054750, mailed Aug. 13, 2019, 4 pages.
Written Opinion of the ISA for PCT/IB/2019/057750, mailed Aug. 13, 2019, 5 pages.
International Search Report for PCT/EP2020/051464, mailed Apr. 21, 2020, 4 pages.
Written Opinion of the ISA for PCT/EP2020/051464, mailed Apr. 21, 2020, 6 pages.
International Search Report for PCT/EP2019/080559, mailed Feb. 11, 2020, 5 pages.
Written Opinion of the ISA for PCT/EP2019/080559, mailed Feb. 11, 2020, 5 pages.
International Search Report for PCT/IB2020/050905 mailed Aug. 4, 2020, 3 pages.

(56) References Cited

OTHER PUBLICATIONS

Written Opinion of the ISA for PCT/IB2020/050905 mailed Aug. 4, 2020, 5 pages.

* cited by examiner

COFFEE GRINDING MACHINE CONFIGURED TO PROVIDE DIFFERENT PARTICLE SIZE PROFILES AND ASSOCIATED METHOD

This application is the U.S. national phase of International Application No. PCT/IB2020/050907 filed Feb. 5, 2020 which designated the U.S. and claims priority to IT Patent Application No. 102019000001629 filed Feb. 5, 2019, the entire contents of each of which are hereby incorporated by reference.

BACKGROUND

The present invention relates to a machine for grinding coffee beans. The machine for grinding coffee beans may be a separate machine or may be incorporated in a machine for the production of coffee-based beverages. Such a machine for grinding coffee beans is also known simply as a "coffee grinding machine", "coffee grinder" or "mill". The present invention also relates to an espresso coffee machine cooperating with said coffee grinding machine and to a method for grinding coffee in the form of beans.

PRIOR ART

As is known, for the preparation of an espresso coffee, a certain quantity of ground coffee, usually referred to as "dose", is used. The dose of ground coffee is loaded into a filter, typically in the form of a cup which is open at the top and which has a bottom with micro-perforations. Typically the dose of coffee is pressed inside the filter to form a puck of coffee powder. The filter is in turn supported by a portafilter configured to engage removably with a dispensing unit of an espresso coffee machine. The espresso coffee is obtained by passing hot water under pressure through the puck of coffee powder.

The coffee powder is obtained with a coffee grinding machine. In a known coffee grinding machine the coffee beans are ground by passing them through grinding members. Grinding members of the flat, conical or cylindrical type are known. Typically, the grinding members of a coffee grinding machine comprise a stationary member and a member rotating relative to the stationary member. For example, in a coffee grinder with conical grinders, one grinder is immobile and stationary, while the other grinder is rotated by a motor. Some coffee grinding machines are able to modify the distance between the grinders in order to vary the particle size of the coffee powder.

WO 2013/112732 A1 describes an automatic adjustment system for a coffee grinder.

WO 2009/010190 A1 describes a method for controlling a coffee grinder.

WO 2013/121438 A1 describes a method and a machine for extracting coffee.

EP 3,042,591 A1 describes a method for adjusting the fineness of a coffee grinder.

WO 2014/207281 A1 describes a control device for a coffee grinder.

SUMMARY OF THE INVENTION

The Applicant has carried out experiments in connection with ground coffee powder. For the purposes of the present invention, the ground coffee powder is considered to be formed substantially by particles or granules which have a theoretical characteristic size. This theoretical characteristic size will also be referred to below in the present description by the term "equivalent diameter". Furthermore, the expression "ground coffee" may be used as an alternative to the more complete expression "ground coffee powder" or " coffee powder".

The Applicant has realized that all the known coffee grinding machines, whoever the manufacturer or whatever the type of grinding members or the particular mechanism used, produce ground coffee comprising granules which vary greatly in size from each other. The range of equivalent diameters covers three orders of magnitude, from a few microns to more than one millimetre.

Figure 1:
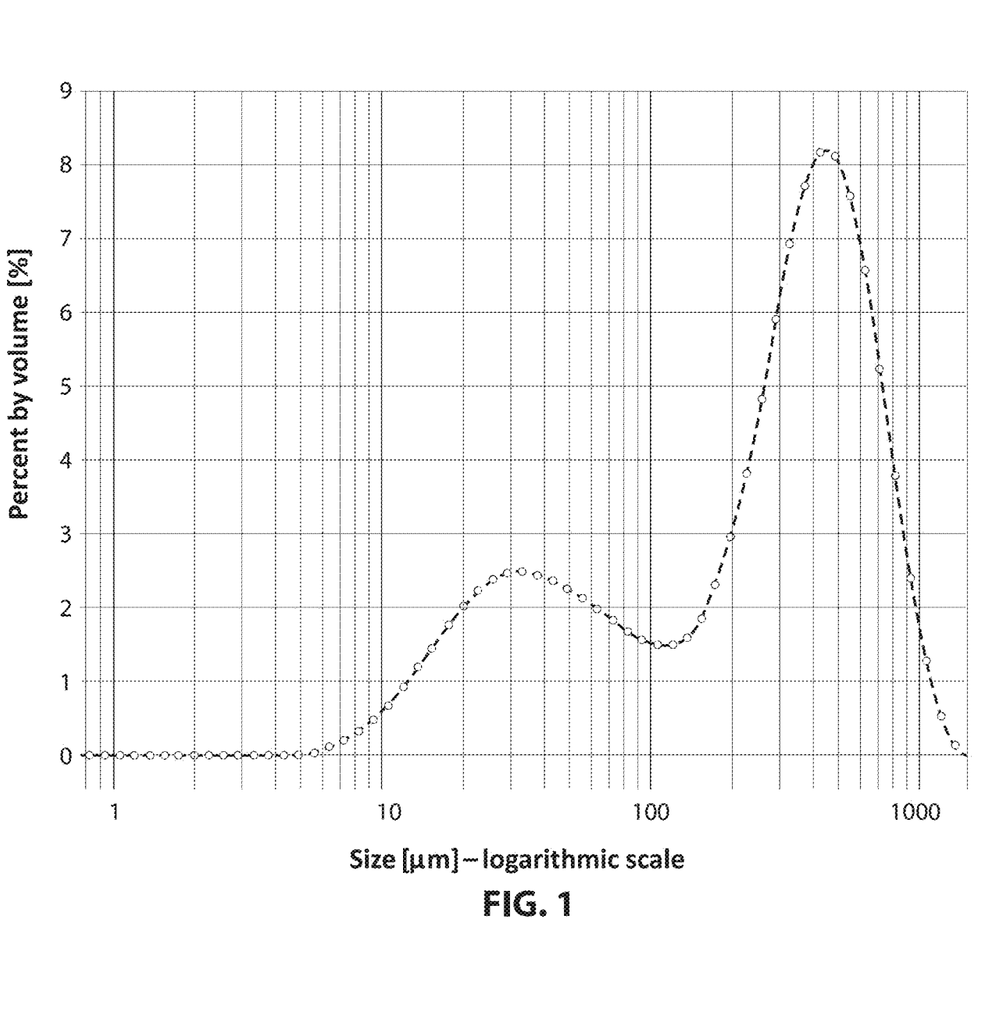
FIG. 1 is graph showing an example of a particle size profile expressed on a logarithmic scale.

The relative abundance of the granules may be expressed as a particular profile called a "particle size profile" which has a progression (irrespective of the coffee grinding machine used) similar to that shown in FIG. 1.

The curve which shows the particle size profile is called a bimodal profile. The large peak (on the right) is referred to as "first modal", while the small peak (on the left) is referred to as "second modal".

As mentioned briefly above, the purpose of the ground coffee is that of being used in an espresso coffee machine for dispensing coffee beverages.

As is obvious, particle sizes where there is a greater amount of small particles result in a smaller water flow and therefore in coffee which is "shorter" during the same dispensing time compared to particle sizes where there is a greater amount of large particles.

Typically, each barista suitably adjusts his/her coffee grinding machine so as to obtain a particle size which, in his/her opinion, produces an optimum beverage.

Whether the machine has flat grinders, conical grinders or cylindrical grinders, the smaller the distance between the grinding elements, the greater will be the amount of fine particles and the smaller the amount of coarse particles. With an increase in the distance between the grinding bodies the opposite result is obtained.

Typically, many producers of known coffee grinding machines have employed the same system in order to vary the particle size, i.e. that of varying the distance between the grinding bodies.

The Applicant has realized that varying the distance between the grinding bodies not only results in a variation in the relative amount of coarser and finer portions of ground coffee, but also shifts horizontally the peak of the first modal: when the distance between the grinders is increased, the peak moves to the right (towards the larger particle sizes), whereas when the distance between the grinders is reduced the peak moves to the left (towards the finer particle sizes).

In the commercially available systems the variation in the distance between the grinders may be performed manually or electrically by means of an electric actuator (usually a motor).

The Applicant has defined the aim of providing a coffee grinding machine configured to provide a dose of ground coffee having a predetermined particle size profile so as to obtain a predetermined flow (in terms of volumetric flowrate or mass flowrate) when the dose is used to prepare an espresso coffee in an espresso coffee machine. In turn, the relationship between flowrate and dose influences the brew ratio.

For the purposes of the present description and the claims, the expression "brew ratio" (degree of concentration or degree of concentration of a beverage) or "brewing ratio" is understood as meaning the ratio between the mass of ground coffee used and the mass of the final beverage dispensed.

The Applicant has realized that different rotation speeds of the grinders produce different particle-size profiles. In particular:

when the speed is reduced on average finer powders are obtained, and when the speed is increased on average coarser powders are obtained.

According to the present invention, a coffee grinding machine is provided where different particle-size profiles are obtained by suitably varying the rotation speed of the grinders depending on external information, for example information relating to the flow (volumetric flowrate or mass flowrate).

According to a first aspect, a coffee grinding machine and an espresso coffee machine are provided, wherein the coffee grinding machine comprises a first grinder and a second grinder, wherein at least one of the first and second grinders is rotatable, wherein said grinders cooperate with each other so as to grind coffee beans, obtaining a first dose of ground coffee during a first grinding cycle, wherein said coffee grinding machine comprises a motor which rotates one of the grinders relative to the other grinder at a rotation speed, wherein said coffee grinding machine is configured to modify a grinding parameter for performing a second grinding cycle in which a second dose of ground coffee is obtained, wherein said grinding parameter is modified depending on quantitative information received from said espresso coffee machine and based on a coffee preparation cycle performed with said first dose of ground coffee, wherein said grinding parameter comprises the rotation speed, wherein said quantitative information comprises at least one of the following: a flow value measured by a flowmeter of said espresso coffee machine and a brew ratio value.

The espresso coffee machine is connected to or associated with the coffee grinding machine and form an assembly or complex.

For the purposes of the present description and the attached claims, the expression "brew ratio" (degree of concentration or degree of concentration of a beverage) or "brewing ratio" is understood as meaning the ratio between the mass of ground coffee used and the mass of the final beverage dispensed.

For the purpose of the present description and the attached claims, two beverages have the same brew ratio when the aforementioned ratio is identical or differs by a percentage (in absolute terms) less than about 10%, preferably less than about 5% and even more preferably less than about 2-3%.

According to embodiments, the first dose is ground during a grinding cycle immediately prior to the grinding of the second dose.

According to embodiments a connection module for connecting together the espresso coffee machine and the coffee grinding machine is also provided.

The connection module may be configured to connect wirelessly the coffee grinding machine to the espresso coffee machine.

Advantageously a comparator may be provided for comparing the flow value with a reference flow value and a speed variator device is provided for (i) reducing the rotation speed of the motor if the flow value is greater than the reference flow value, (ii) increasing the rotation speed of the motor if the flow value is less than the reference flow value, and (iii) maintaining the rotation speed of the motor if the flow value is substantially the same as the reference flow value.

According to embodiments a first device for measuring the mass of said first dose of ground coffee, a second device for measuring the mass of the espresso coffee prepared, and a processor device for calculating a brew ratio corresponding to a ratio between said mass of the first dose and the said mass of the espresso coffee prepared with said first dose are provided.

According to embodiments, a comparator for comparing the brew ratio value with a reference brew ratio value and a speed variator device are also provided, said speed variator device being configured to (i) reduce the rotation speed of the motor if the brew ratio value is greater than the reference brew ratio value, (ii) increase the rotation speed of the motor if the brew ratio value is less than the reference flow value, and (iii) maintain the rotation speed of the motor if the brew ratio value is substantially the same as the reference brew ratio value.

According to another aspect a method for grinding coffee beans is provided, the method comprising:

providing a first and second grinder cooperating with each other, wherein at least one of the first and second grinders is rotatable, wherein said grinders cooperate with each other so as to grind coffee beans, obtaining a first dose of ground coffee during a first grinding cycle, providing a motor for rotating one of the grinders relative to the other one at a rotation speed, modifying a grinding parameter in order to perform a second grinding cycle in which a second dose of ground coffee is obtained, wherein said grinding parameter is modified depending on quantitative information received from a coffee machine and based on a coffee preparation cycle performed with said first dose of ground coffee, wherein said grinding parameter comprises the rotation speed, wherein said quantitative information comprises at least one of the following: a flow value and a brew ratio value.

The first dose is preferably ground during a grinding cycle immediately prior to the grinding of the second dose.

The method may also comprise the step of comparing the flow value with a reference flow value and (i) reducing the rotation speed of the motor if the flow value is greater than the reference flow value, (ii) increasing the rotation speed of the motor if the flow value is less than the reference flow value, and (iii) maintaining the rotation speed of the motor if the flow value is substantially the same as the reference flow value.

The method may also comprise the step of measuring the mass of said first dose of ground coffee, the step of measuring the mass of the espresso coffee prepared and calculating a brew ratio corresponding to a ratio between said mass of the first dose and said mass of the espresso coffee prepared with said first dose.

A step may also be provided for comparing the brew ratio value with a reference brew ratio value and (i) reducing the rotation speed of the motor if the brew ratio value is greater than the reference brew ratio value, (ii) increasing the rotation speed of the motor if the brew ratio value is less than the reference brew ratio value, and (iii) maintaining the rotation speed of the motor if the brew ratio value is substantially the same as the reference brew ratio value.

BRIEF DESCRIPTION OF THE DRAWINGS

There now follows a detailed description of the invention, provided by way of a non-limiting example, to be read with reference to the attached drawings, in which.

DETAILED DESCRIPTION

FIG. 1, which has already been briefly referred to above, is a graph showing an example of a granulometric profile of a dose of coffee powder. The curve which shows the particle size profile is called a bimodal profile. The high peak (on the right, relating to the larger size particles) is referred to as "first modal" while the low peak (on the left, relating to the smaller size particles) is referred to as "second modal".

Figure 2:
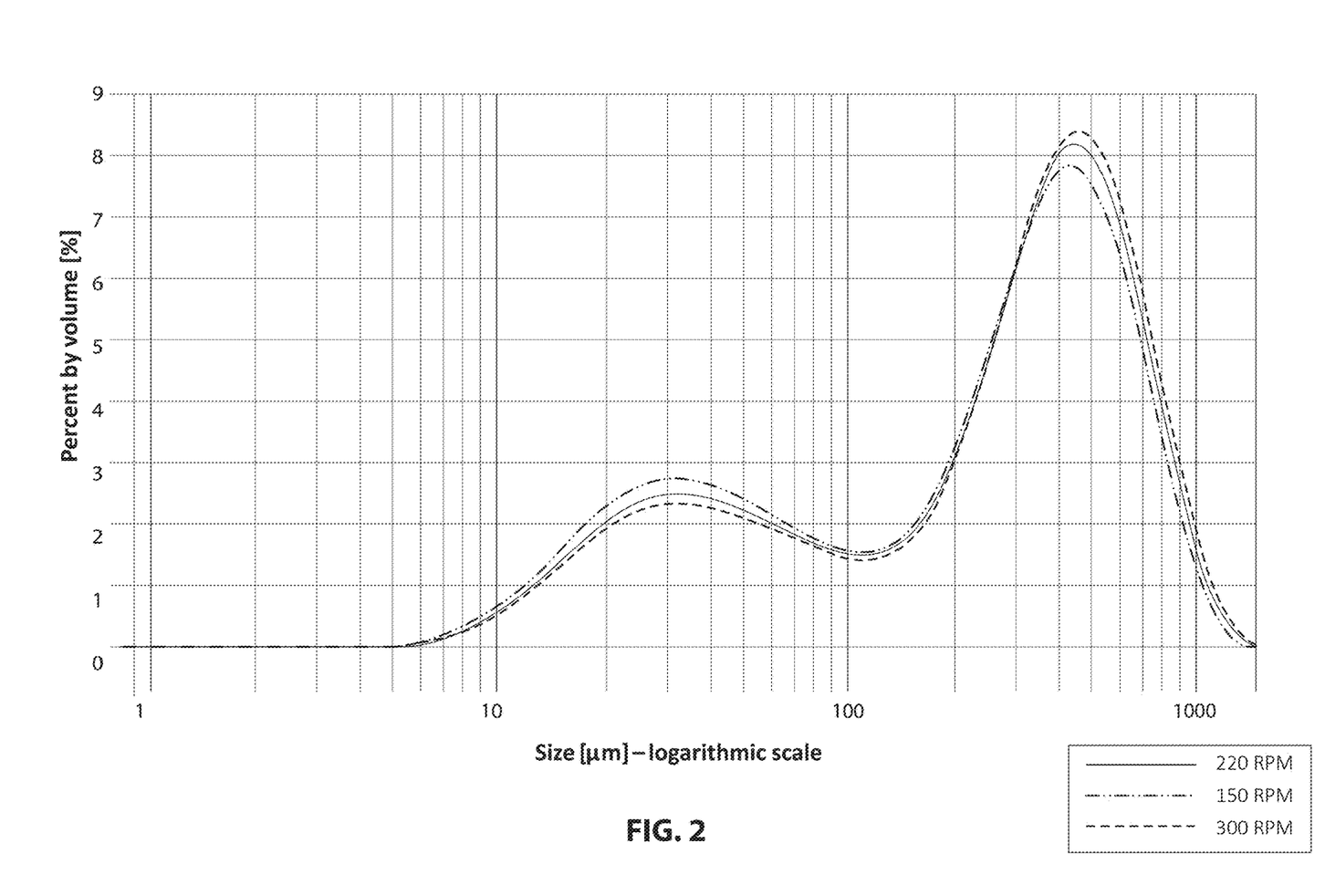
FIG. 2 is graph showing particle size profiles expressed on a logarithmic scale.
Figure 3:
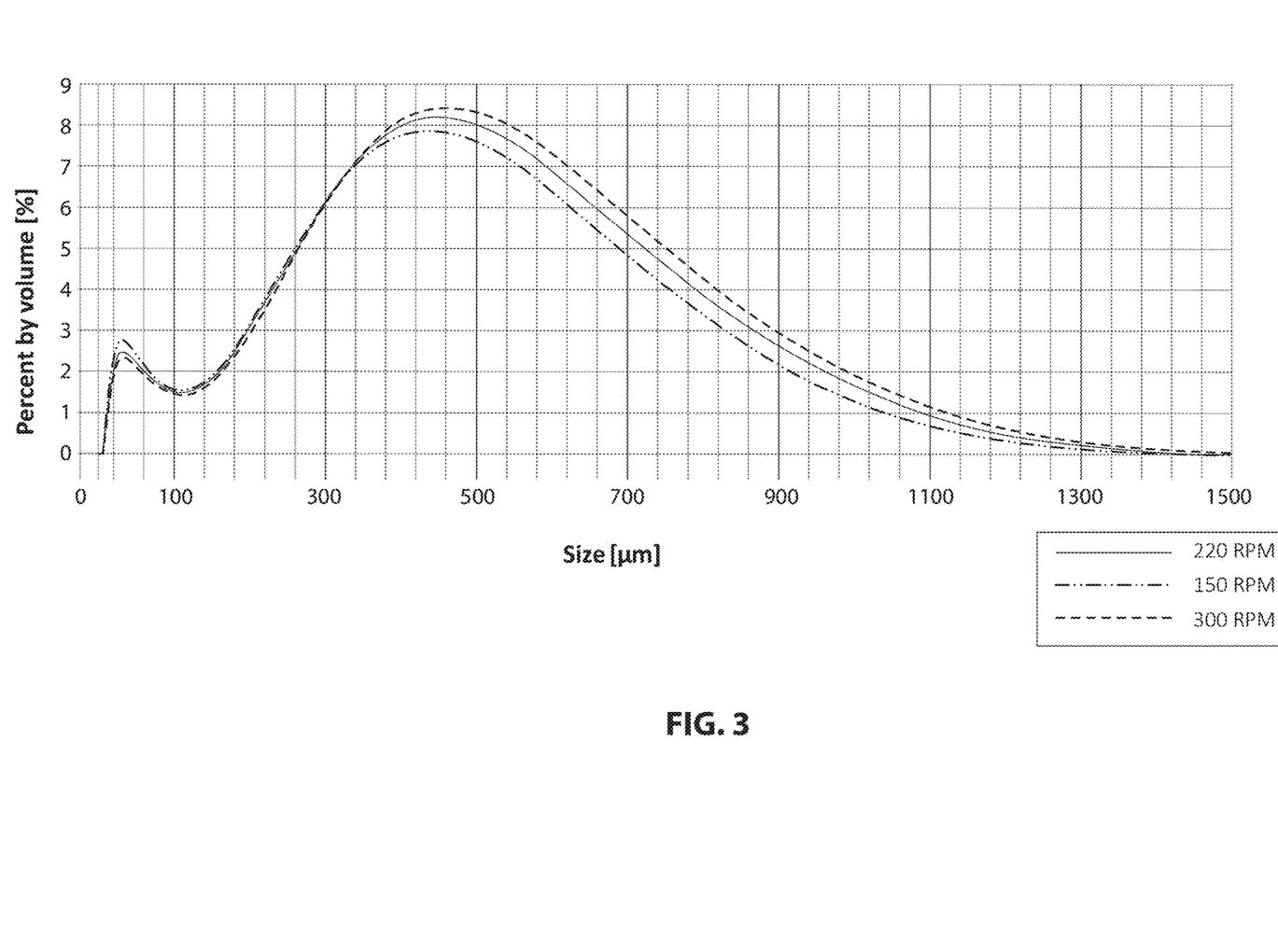
FIG. 3 is graph showing three particle size profiles expressed on a linear scale.

FIGS. 2 and 3 show the influence of the rotation speed of the grinders in relation to the size of the particles. In particular, FIGS. 2 and 3 shows three particle size curves obtained by keeping a constant distance between the grinders and by varying the rotation speed. The two figures show the same profiles expressed on a logarithmic scale in order to emphasize the differences on the second modal and on a linear scale in order to emphasize the differences on the first modal.

As can be seen, at the slower speed (150 rpm), the first modal moves to the left and its relative amount is reduced to the advantage of the second modal.

At the higher speed (300 rpm), the first modal moves to the right and increases its relative amount.

In the case of FIG. 2 (which shows only an example), the first modal of the curve at 150 rpm is located at about 425 μm, while the first modal of curve at 300 rpm is located at about 475 μm.

The variation in speed is obtained by means of a suitable electronic speed regulator for electric motors. Many devices of this type, which vary depending on the type of motor used, are commercially available. According to an embodiment of the present invention, the coffee grinding machine comprises a three-phase asynchronous motor and, for the speed control, an inverter or any known frequency variator.

Figure 4:
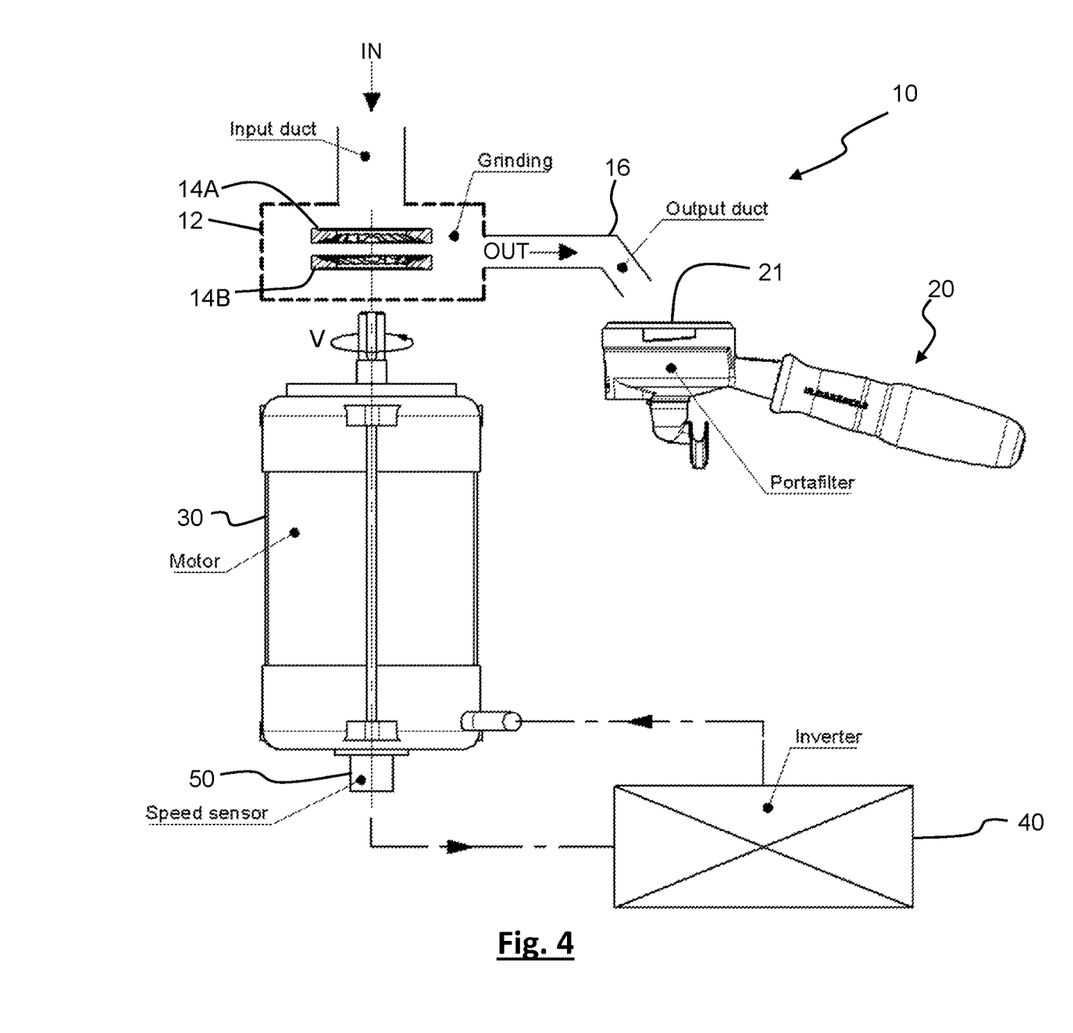
FIG. 4 is a schematic representation of the coffee grinding machine according to an embodiment of the present invention.

FIG. 4 shows in very schematic form the main components of a coffee grinding machine 10 according to embodiments of the present invention.

The machine 10 comprises a grinding chamber 12 with an upper inlet IN for the coffee to be ground, a first grinder 14A and a second grinder 14B cooperating with the first grinder 14A and an outlet conveyor 16 which receives the ground coffee from the grinders 14A and 14B and conveys it so as to be so as to be collected and used. For example, as shown in FIG. 4, the ground coffee may be conveyed towards a filter 21 supported by a portafilter 20 of any known type.

According to an embodiment of FIG. 4, the first grinder 14A is a fixed grinder while the second grinder 14B is movable, for example rotatable.

The coffee grinding machine comprises an electric motor 30 for rotating the second grinder 14B at a certain rotation speed. According to embodiments, the motor is a single-phase motor. For example, the motor is an electric motor comprising one of the following types: universal, DC, single-phase or three-phase AC, brushless, BLDC, stepper or other type of motor.

Preferably, the coffee grinding machine further comprises a frequency variator device 40 for controlling the rotation speed. For example, this frequency variator device comprises an inverter. This frequency variator device 40 is able to vary the grinding speed so as to allow grinding in a constant manner at a first speed or at a second speed.

According to embodiments, the coffee grinding machine further comprises an angular position transducer, for example an encoder 50, associated with the electric motor for measuring in a precise manner the rotation speed of the motor 30.

Figure 5:
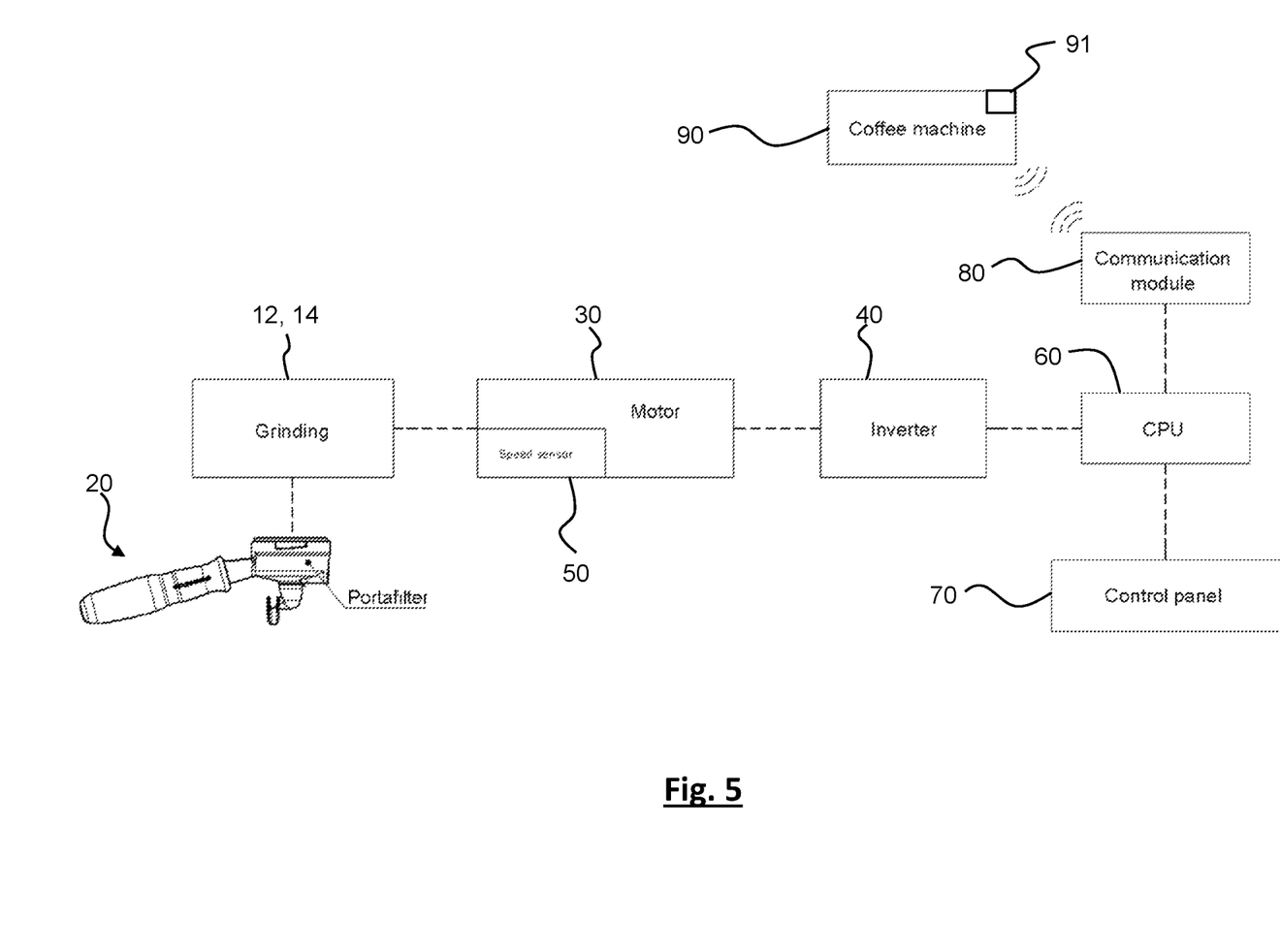
FIG. 5 is another schematic representation of the coffee grinding machine according to the present invention cooperating with an espresso coffee machine.

According to embodiments, the variation in the speed may be performed by the barista via a suitable interface 70 (FIG. 5). The interface 70 may for example comprise a pushbutton (or a plurality of pushbuttons) for selecting a predetermined rotation speed, a rotatable knob for selecting (continuously or discontinuously) a plurality of rotation speeds or a touch screen for choosing from among various available options/speeds. The interface 70 is connected to the inverter 40 (directly or via other devices, such as a processor 60, comprising processor circuitry, shown schematically in FIG. 5) for modifying the power supply frequency of the motor 30 and therefore the speed of the latter. Advantageously, it is possible to provide the option of selecting a rotation speed from among those offered by the manufacturer or a speed chosen by the user. Advantageously, a memory may be provided for storing values of rotation speeds.

According to other embodiments, a control unit such as a central processing unit (CPU 60) comprising processor circuitry is configured to set a rotation speed of the motor 30 depending on external signals, for example supplied by a coffee machine 90 connected to/associated with said coffee grinding machine 10. According to embodiments, the external signals which influence the rotation speed of the motor 30 are not environmental signals (pressure, humidity or temperature), but relate to operation of an espresso coffee machine.

The connection between the coffee machine 90 and the coffee grinding machine 10 may be via a cable (for example a standard data cable or an optical fibre cable) or may be via a wireless connection, for example based on an industrial technical data transmission standard for WPANs (Wireless Personal Area Networks). For example the connection may be via the Bluetooth standard or the like. The connection could also be optical and based on a wireless network. FIG. 5 shows in schematic form a wireless connection between the coffee machine 90 and the coffee grinding machine 10 via a communication module (for example a receiver or a transceiver).

According to embodiments, the speed of the motor 30 is varied depending on information relating to a flow value measured in the espresso coffee machine 90. The flow information is preferably flow information obtained during a cycle for preparation of an espresso coffee with the machine 90 using a dose of coffee powder ground during a grinding step prior to the grinding operation in progress. Preferably, the prior grinding step is the grinding step immediately preceding the grinding step in progress. The flow may advantageously be measured using a flowmeter 91 of the espresso coffee machine 90. The flowmeter 91 may be in any position in the hydraulic circuit of the machine 90, for example in the vicinity of a dispensing unit of the machine 90.

Figure 6:
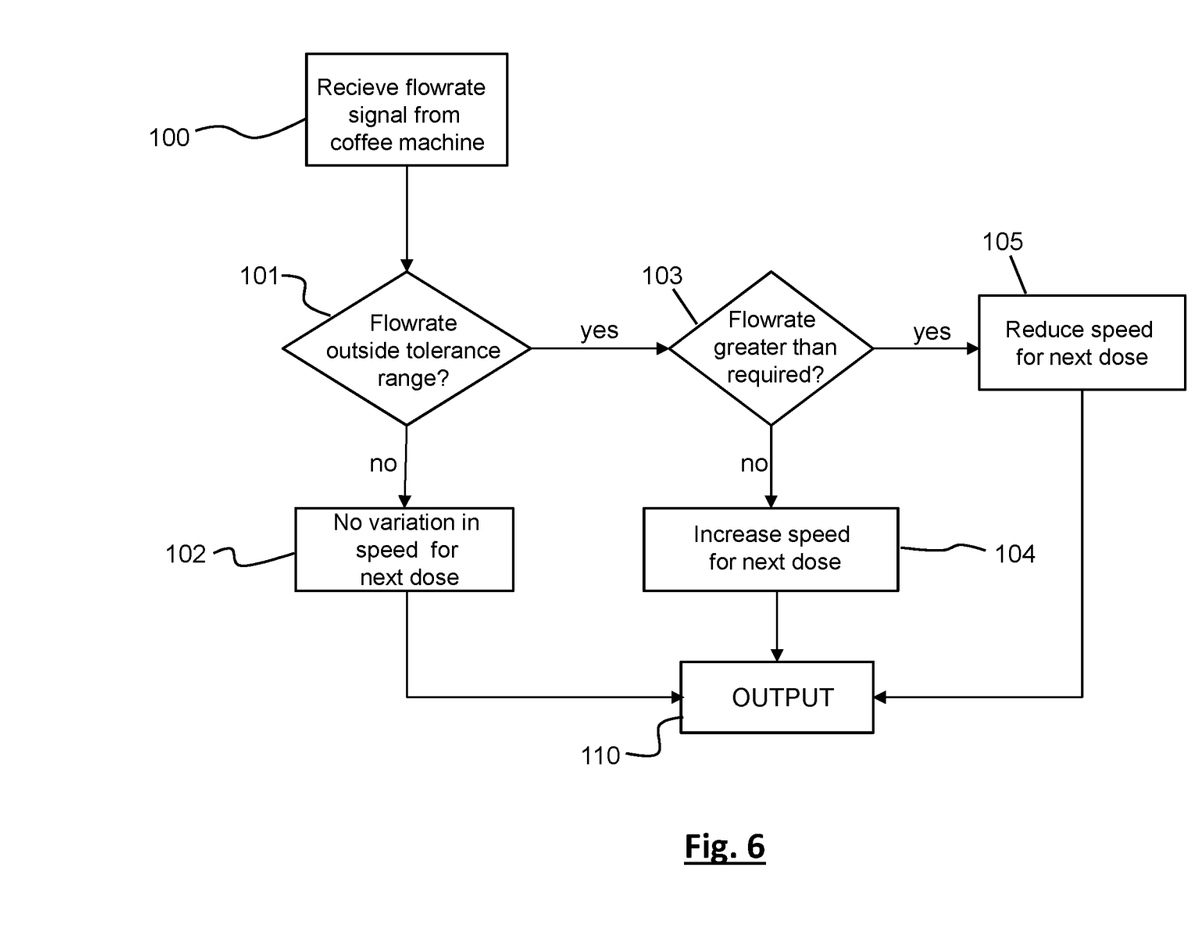
FIG. 6 is a flow diagram of an operating mode.

FIG. 6 shows in schematic form a possible mode for implementing the steps by means of which the rotation speed of the motor 30 is varied depending on the flow information obtained from an associated coffee machine.

After receiving flow information from the espresso coffee machine (step 100), an evaluation is carried out to check whether the flow value measured is outside a predetermined tolerance range (step 101), namely differs from a (desired) reference value, plus or minus a threshold.

If the flow value measured, in relation to the reference dose, lies within the tolerance range, no variation of the rotation speed of the motor is performed (step 102) and therefore grinding of the dose is performed as for grinding of the reference dose, i.e. typically grinding of the previous dose.

If the flow value measured, in relation to the reference dose, is greater than the desired value (taking into account also the tolerance range) the rotation speed of the motor is increased (steps 103 and 105).

If the flow value measured, in relation to the reference dose, is smaller than the desired value (taking into account also the tolerance range) the rotation speed of the motor is decreased (steps 103 and 104).

According to other embodiments, the speed V of the motor 30 is varied depending on information relating to a brew ratio value measured in the espresso coffee machine 90. The brew ratio information is preferably brew ratio information obtained during a cycle for preparation of an espresso coffee with the machine 90 using a dose of coffee powder ground during a grinding step prior to the grinding operation in progress. Preferably, the prior grinding step is the grinding step immediately preceding the grinding step in progress.

Figure 7:
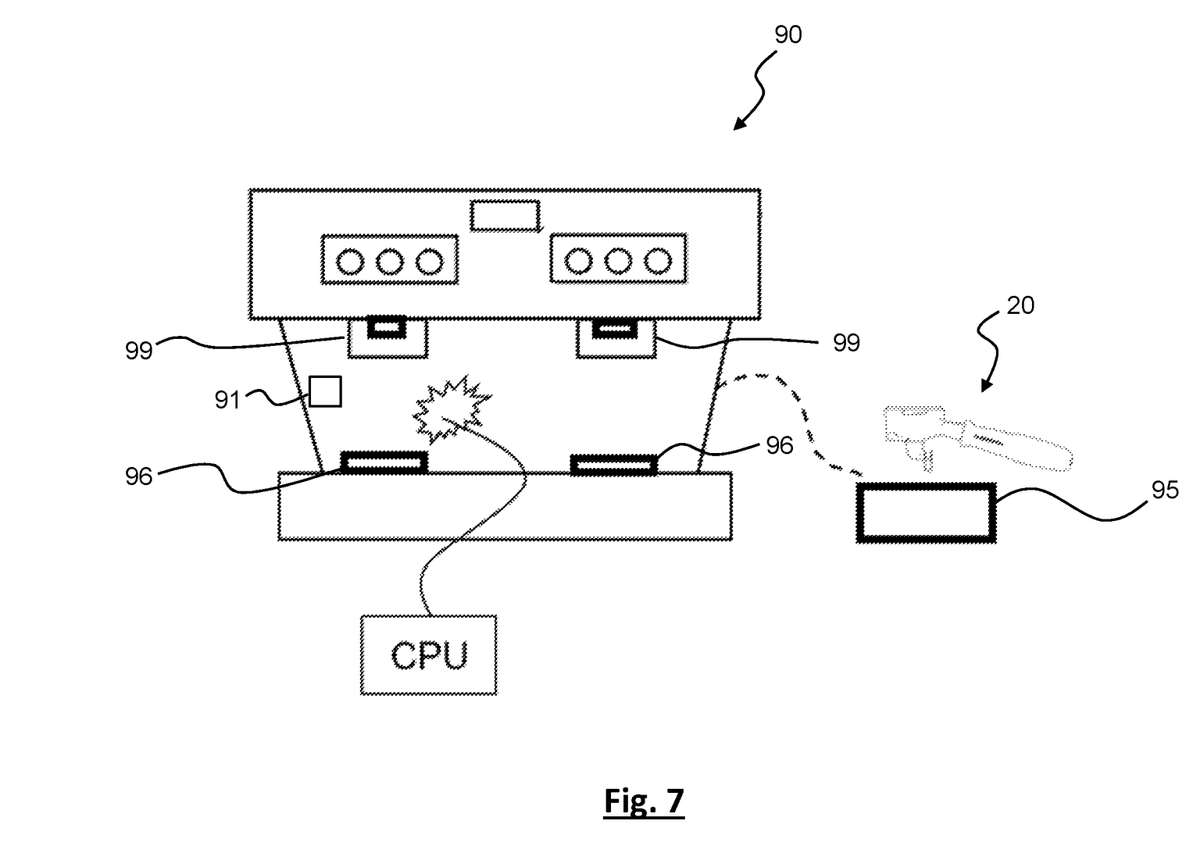
FIG. 7 shows, by way of example, an espresso coffee machine with weighing and processing devices for calculating a brew ratio value.

According to embodiments, the machine 90, as shown in FIG. 7, comprises means for calculating the brew ratio between the mass (or weight) of a quantity of ground coffee used to prepare an espresso coffee and the mass (or weight) of the espresso coffee actually prepared. As is known, consumers require espresso coffee in amounts and/or diluted to different degrees depending on their particular habits and tastes and/or depending on the usual practice of the place where they are present. Thus, a consumer may require a short coffee, a normal coffee, a long coffee, etc. The consumer may also request a single, double, triple, etc., espresso coffee.

Said means for calculating the brew ratio may comprise a first weighing device 95 for measuring the mass of the ground coffee (for example directly in the filter supported by a portafilter 20), a second weighing device 96 for measuring (directly in the cup) the mass of the espresso coffee prepared and a processing device (CPU) configured at least to receive the measurement of the mass of ground coffee and the measurement of the mass of espresso coffee prepared and to obtain said brew ratio from the two mass measurements. FIG. 7 also shows in schematic form two dispensing units 99 configured for engagement with a portafilter 20.

Therefore, the speed of the motor is decided depending on the quantitative information received from a coffee machine for which the ground coffee is intended. Advantageously, the value obtained on the basis of a dose is used to decide whether to maintain or modify the grinding parameters (for example the grinding speed) of a next dose.

The system may function both in an open loop, i.e. without measuring the actual speed V of rotation of the motor, or in a closed loop, i.e. detecting the speed of the motor using a dedicated device, for example the speed sensor (encoder) 50.

Advantageously, according to the present invention, it is possible to solve the problem of defining a balance in the grinding particle size between a single-dose coffee and a double-dose coffee. For example it is possible to provide two pushbuttons, one for grinding a single dose and one for grinding a double dose. According to the present invention, in order to grind a single dose, it is possible to program the coffee grinding machine so that a specific speed V1 (for obtaining a certain particle size) and a first quantity W1 are associated with the corresponding pushbutton. Similarly, according to the present invention, in order to grind a double dose, it is possible to program the coffee grinding machine so that a specific speed V2 (for obtaining a certain particle size) and a second quantity W2 are associated with the corresponding pushbutton.

Even if a service requiring alternation of single coffees at a speed V1 and double coffees at a speed V2 should arise, the system would not suffer as a result.

This flexibility is very advantageous. In fact, at present, the particle size selected by the barista is necessarily a compromise between the single dose and the double dose. With the present invention this limitation is overcome.

The invention claimed is:

1. A coffee grinding machine comprising:
   a first grinder and a second grinder, wherein at least one of the first and second grinders is rotatable, wherein said grinders cooperate with each other so as to grind coffee beans, obtaining a first dose of ground coffee during a first grinding cycle;
   a motor which rotates one of the grinders-relative to the other grinder at a speed of rotation;
   processor circuitry which causes the coffee grinding machine to modify a grinding parameter for performing a second grinding cycle in which a second dose of ground coffee is obtained,
      wherein said grinding parameter is modified depending on quantitative information received from an espresso coffee machine and based on a coffee preparation cycle performed by the espresso coffee machine with said first dose of ground coffee,
      wherein said grinding parameter comprises the rotation speed, and
      wherein said quantitative information comprises at least one of the following: a flow value of coffee dispensed from said espresso coffee machine and a brew ratio value.

2. The coffee grinding machine according to claim 1, wherein said first dose is ground during a grinding cycle immediately prior to the grinding of the second dose.

3. The coffee grinding machine according to claim 1, further comprising a connector configured to connect said espresso coffee machine and said coffee grinding machine.

4. The coffee grinding machine according to claim 3, wherein said connector is configured to wirelessly connect said coffee grinding machine to the espresso coffee machine.

5. The coffee grinding machine according to claim 1, wherein the processor circuitry is configured to compare the flow value with a reference flow value and to control the rotation speed of the motor so that (i) the rotation speed of the motor is reduced if the flow value is greater than the reference flow value, and (ii) the rotation speed of the motor is increased if the flow value is less than the reference flow value.

6. The coffee grinding machine according to claim 1, wherein the processor circuitry is configured to calculate the brew ratio value corresponding to a ratio between a mass of the first dose of the ground coffee and a mass of the espresso coffee prepared with said first dose.

7. The coffee grinding machine according to claim 6, wherein the processor circuitry is configured to compare the brew ratio value with a reference brew ratio value to control the rotation speed of the motor so that (i) the rotation speed of the motor is reduced if the brew ratio value is greater than the reference brew ratio value, and (ii) the rotation speed of the motor is increased if the brew ratio value is less than the reference flow value.

8. The coffee grinding machine according to claim 3, wherein said connector comprises a cable configured to connect said coffee grinding machine to the espresso coffee machine.

9. The coffee grinding machine according to claim 5, wherein the processor circuitry is configured to compare the flow value with the reference flow value and to control the rotation speed of the motor so that the rotation speed of the motor is maintained if the flow value is the same as the reference flow value.

10. The coffee grinding machine according to claim 7, wherein the processor circuitry is configured to compare the brew ratio value with the reference brew ratio value to control the rotation speed of the motor so that the rotation speed of the motor is maintained if the brew ratio value is the same as the reference brew ratio value.

11. A combination of a coffee grinding machine and an espresso coffee machine,
wherein the coffee grinding machine comprises:
a first grinder and a second grinder, wherein at least one of the first and second grinders is rotatable, wherein said grinders cooperate with each other so as to grind coffee beans, obtaining a first dose of ground coffee during a first grinding cycle;
a motor which rotates one of the grinders relative to the other grinder at a speed of rotation;
processor circuitry which causes the coffee grinding machine to modify a grinding parameter for performing a second grinding cycle in which a second dose of ground coffee is obtained,
wherein the espresso coffee machine comprises:
a filter in which the first dose of coffee is pressed as a puck of coffee power;
a portafilter which supports the filter and from which coffee is dispensed as hot water is passed through the puck of coffee;
processor circuitry configured to determine quantitative information of the espresso coffee machine based on a coffee preparation cycle performed by the espresso coffee machine with said first dose of ground coffee;
wherein said grinding parameter is modified depending on the quantitative information received from the espresso coffee machine;
wherein said grinding parameter comprises the rotation speed, and
wherein said quantitative information comprises at least one of the following: a flow value of coffee dispensed from said espresso coffee machine and a brew ratio value.

12. The apparatus according to claim 11, wherein said first dose is ground during a grinding cycle immediately prior to the grinding of the second dose.

13. The apparatus according to claim 11, further comprising a connector configured to connect said espresso coffee machine and said coffee grinding machine.

14. The apparatus according to claim 13, wherein said connector is configured to wirelessly connect said coffee grinding machine to the espresso coffee machine.

15. The apparatus according to claim 11, wherein the processor circuitry is configured to compare the flow value with a reference flow value and to control the rotation speed of the motor so that (i) the rotation speed of the motor is reduced if the flow value is greater than the reference flow value, and (ii) the rotation speed of the motor is increased if the flow value is less than the reference flow value.

16. The apparatus according to claim 11, wherein the processor circuitry is configured to calculate the brew ratio value corresponding to a ratio between a mass of the first dose of the ground coffee and a mass of the espresso coffee prepared with said first dose.

17. The apparatus according to claim 16, wherein the processor circuitry is configured to compare the brew ratio value with a reference brew ratio value to control the rotation speed of the motor so that (i) the rotation speed of the motor is reduced if the brew ratio value is greater than the reference brew ratio value, and (ii) the rotation speed of the motor is increased if the brew ratio value is less than the reference flow value.

* * * * *